(12) United States Patent
Tokuno et al.

(10) Patent No.: US 9,724,863 B2
(45) Date of Patent: Aug. 8, 2017

(54) INJECTION MOLDING MACHINE

(71) Applicant: SUMITOMO HEAVY INDUSTRIES, LTD., Tokyo (JP)

(72) Inventors: Ryuichi Tokuno, Chiba (JP); Suguru Nishimura, Chiba (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 13/790,476

(22) Filed: Mar. 8, 2013

(65) Prior Publication Data

US 2013/0251836 A1    Sep. 26, 2013

(30) Foreign Application Priority Data

Mar. 26, 2012   (JP) .................. 2012-070437

(51) Int. Cl.
| | | |
|---|---|---|
| *B29C 45/80* | (2006.01) | |
| *B29C 45/76* | (2006.01) | |
| *B29C 45/77* | (2006.01) | |

(52) U.S. Cl.
CPC .............. *B29C 45/80* (2013.01); *B29C 45/76* (2013.01); *B29C 45/768* (2013.01); *B29C 45/7653* (2013.01); *B29C 45/77* (2013.01); *B29C 2945/76013* (2013.01); *B29C 2945/76096* (2013.01); *B29C 2945/76234* (2013.01); *B29C 2945/76384* (2013.01); *B29C 2945/76391* (2013.01); *B29C 2945/76408* (2013.01); *B29C 2945/76481* (2013.01); *B29C 2945/76645* (2013.01); *B29C 2945/76869* (2013.01); *B29C 2945/76933* (2013.01)

(58) Field of Classification Search
CPC ..... B29C 45/80; B29C 45/76; B29C 45/7653; B29C 45/768; B29C 45/77

USPC ........................................ 425/150
See application file for complete search history.

(56) References Cited

U.S. PATENT DOCUMENTS

| | | | |
|---|---|---|---|
| 2004/0067276 A1* | 4/2004 | Watanabe | ............ 425/595 |
| 2008/0233227 A1 | 9/2008 | Onishi et al. | |
| 2012/0146260 A1 | 6/2012 | Murata et al. | |

FOREIGN PATENT DOCUMENTS

| | | |
|---|---|---|
| DE | 102011013380 | 12/2011 |
| EP | 0649721 | 4/1995 |

(Continued)

OTHER PUBLICATIONS

Extended European Search Report dated Apr. 14, 2014.

*Primary Examiner* — Joseph S Del Sole
*Assistant Examiner* — John Robitaille
(74) *Attorney, Agent, or Firm* — IPUSA, PLLC

(57) ABSTRACT

An injection molding machine is provided that includes a clamping force sensor that detects a clamping force of a mold, and a clamping force monitoring unit that monitors a detected value of the clamping force sensor and calculates a first mold open distance and/or a second mold open distance. The first mold open distance is calculated based on the difference between the maximum value of the detected values obtained during an injection process and a pressure holding process and the detected value obtained at the start of the injection process. The second mold open distance that is calculated based on the difference between the detected value obtained at the end of the pressure holding process and the detected value obtained at the start of the injection process.

8 Claims, 3 Drawing Sheets

(56) References Cited

FOREIGN PATENT DOCUMENTS

| | | |
|---|---|---|
| JP | 2004-122579 | 4/2004 |
| JP | 2008-006651 | 1/2008 |
| WO | WO2005/068155 | 7/2005 |
| WO | 2011161899 | 12/2011 |

* cited by examiner

INJECTION MOLDING MACHINE

RELATED APPLICATION

Priority is claimed to Japanese Patent Application No. 2012-070437 filed on Mar. 26, 2012, the entire contents of which are hereby incorporated by reference.

BACKGROUND OF THE INVENTION

1. Field of the Invention

The present invention relates to an injection molding machine.

2. Description of the Related Art

An injection molding machine manufactures a molding product by injecting molten resin into a cavity of a mold device and solidifying the molten resin. The mold device includes a stationary mold and a movable mold, and the cavity is formed between the stationary mold and the movable mold when the mold device is clamped. The molding product that is molded in the cavity is removed from the movable mold after opening the mold device. (See, e.g., International Patent Publication No. WO2005/068155).

Injection molding machines have various sensors for obtaining information relating to injection molding.

SUMMARY OF THE INVENTION

According to an embodiment of the present invention, an injection molding machine is provided that includes a clamping force sensor that detects a clamping force of a mold, and a clamping force monitoring unit that monitors a detected value of the clamping force sensor and calculates a first mold open distance and/or a second mold open distance. The first mold open distance is calculated based on the difference between the maximum value of the detected values obtained during an injection process and a pressure holding process and the detected value obtained at the start of the injection process. The second mold open distance is calculated based on the difference between the detected value obtained at the end of the pressure holding process and the detected value obtained at the start of the injection process.

DETAILED DESCRIPTION OF THE PREFERRED EMBODIMENT

Figure 1:
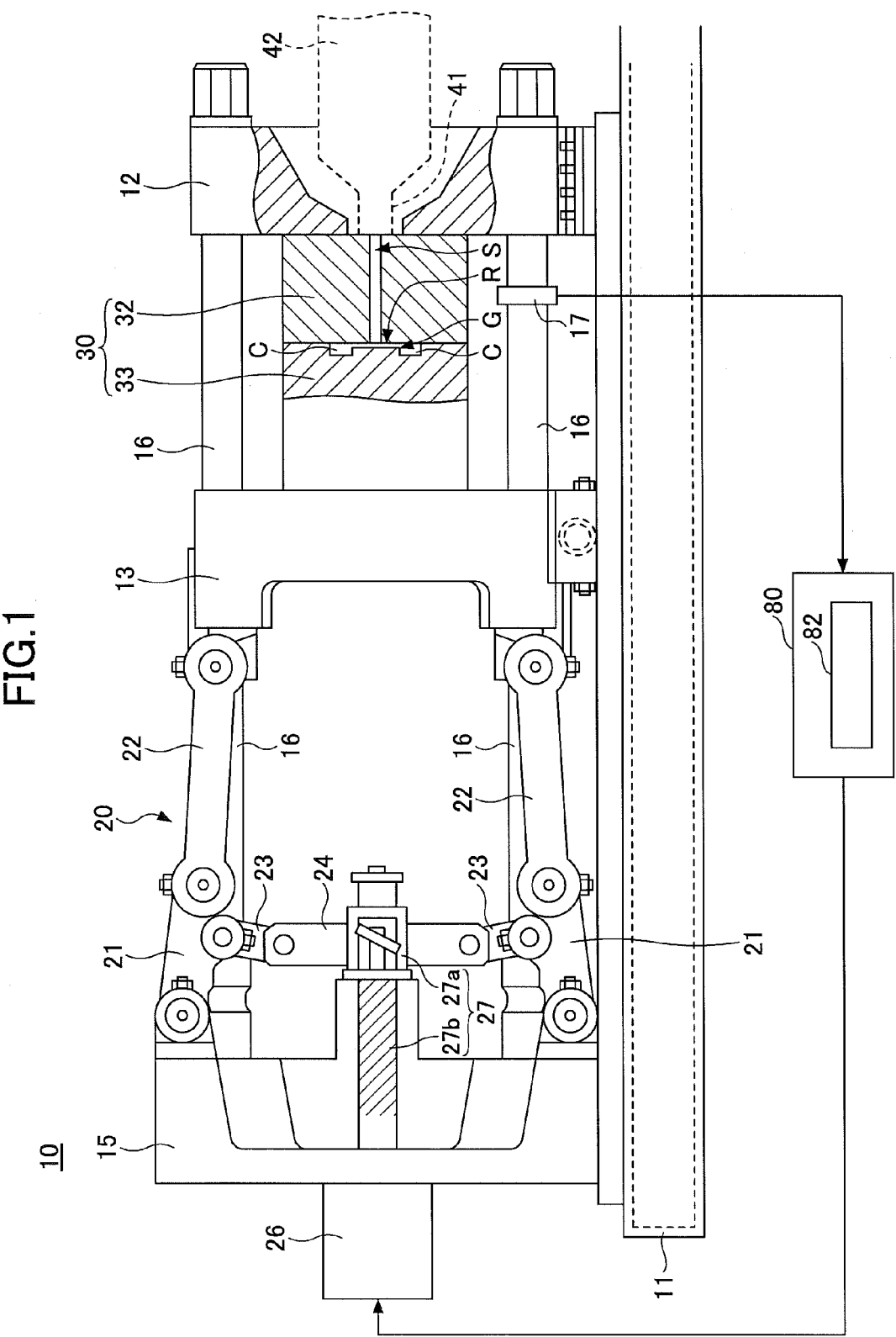
FIG. 1 is a diagram showing a mold clamping device of an injection molding machine according to an embodiment of the present invention.

In the following, embodiments of the present invention are described with reference to the accompanying drawings. It is noted that identical or corresponding features shown in two or more of the drawings are given the same reference numerals and their descriptions may be omitted.

According to an embodiment of the present invention, an injection molding machine is provided that can obtain useful information for injection molding.

(Mold Clamping Device)

FIG. 1 is a diagram showing a mold clamping device of an injection molding machine 10 according to an embodiment of the present invention. It is noted that FIG. 1 shows the mold clamping device when a mold device 30 is clamped. Also, in the following descriptions, it is assumed that the moving direction of a movable platen 13 for closing the mold device 30 corresponds to a forward direction, and the moving direction of the movable platen 13 for opening the mold device 30 corresponds to a backward direction.

The injection molding machine 10 includes a frame 11, a stationary platen 12 that is fixed to the frame 11, and a toggle support 15 that is spaced apart from the stationary platen 12 and is arranged to be movable with respect to the frame 11. Multiple (e.g., 4) tie-bars 16 are arranged across the space between the stationary platen 12 and the toggle support 15.

The injection molding machine 10 also includes a movable platen 13 that is arranged to face the stationary platen 12 and is capable of moving back and forth (the left and right directions of FIG. 1) along the tie-bars 16. Further, a movable mold 33 is attached to the face of the movable platen 13 facing the stationary platen 12, and a stationary mold 32 is attached to a face of the stationary platen 12 facing the movable platen 13. The stationary mold 32 and the movable mold 33 form the mold device 30.

The injection molding machine 10 further includes a toggle mechanism 20 that is arranged between the movable platen 13 and the toggle support 15, a mold clamping motor 26 that drives the toggle mechanism 20, a ball screw mechanism 27 corresponding to a transmission mechanism that converts the rotational motion of the mold clamping motor 26 into a linear motion and transmits the converted motion to the toggle mechanism 20. It is noted that the stationary platen 12, the movable platen 13, the toggle support 15, the toggle mechanism 20, and the mold clamping motor 26 form the mold clamping device.

The toggle mechanism 20 includes a cross head 24 that is movable in directions parallel to the mold closing and opening directions, a second toggle lever 23 that is swingably connected to the cross head 24, a first toggle lever 21 that is swingably connected to the toggle support 15, and a toggle arm 22 that is swingably connected to the movable platen 13. The first toggle lever 21 and the second toggle lever 23 are linked together, and the first toggle lever 21 and the toggle aim 22 are linked together. It is noted that the toggle mechanism 20 corresponds to a so-called five-point double-toggle mechanism having upper and lower portions that are symmetrical.

The ball screw mechanism 27 includes a ball screw nut 27a that is fixed to the cross head 24 and a ball screw shaft 27b that is screwed to the ball screw nut 27a, for example. The ball screw shaft 27b is rotatably supported by the toggle support 15. The ball screw shaft 27b rotates in response to the rotation of an output shaft of the mold clamping motor 26. In turn, the ball screw nut 27a moves back and forth which causes the cross head 24 to move back and forth.

By driving the mold clamping motor 26 in the forward direction, the cross head 24 corresponding to a driven member is moved forward and the toggle member 20 is activated to cause the movable platen 13 to move forward and to thereby perform a mold closing operation.

By driving the mold clamping motor 26 further in the forward direction, the toggle mechanism 20 generates a clamping force equal to the thrust force of the mold clamping motor 26 multiplied by the toggle rate. It is noted that a clamping force sensor 17 is attached to the tie-bar 16. The clamping force sensor 17 detects the clamping force at predetermined time intervals by detecting the strain (extension) of the tie-bar 16. The detected clamping force is sequentially input to a control unit 80 and is monitored by a clamping force monitoring unit 82 of the control unit 80. It is also noted that a cavity C is formed between the stationary mold 32 and the movable mold 33 when the mold device 30 is clamped. Molten resin is injected into the cavity C and then solidified to become a molding product.

Then, by driving the mold clamping motor 26 in the reverse direction, the cross head 24 is moved backward and the toggle mechanism 20 is activated to cause the movable platen 13 to move backward and to thereby perform a mold opening operation. Then, an electric ejector device may be operated to eject the molding product from the movable mold 33.

It is noted that in the mold clamping device according to the present embodiment, the toggle mechanism 20 is used to generate the clamping force. However, the present invention is not limited to such type of mold clamping device. For example, in one alternative embodiment, the thrust force generated by the mold clamping motor 26 may be directly transmitted to the movable platen 13 as a direct clamping force without using the toggle mechanism 20. In another embodiment, a thrust force generated by a mold clamping cylinder may be transmitted to the movable platen 13 as a direct clamping force. In a further embodiment, mold closing and opening operations may be realized by a linear motor, and a mold clamping operation may be realized using an electromagnet.

(Injection Device)

Figure 2:
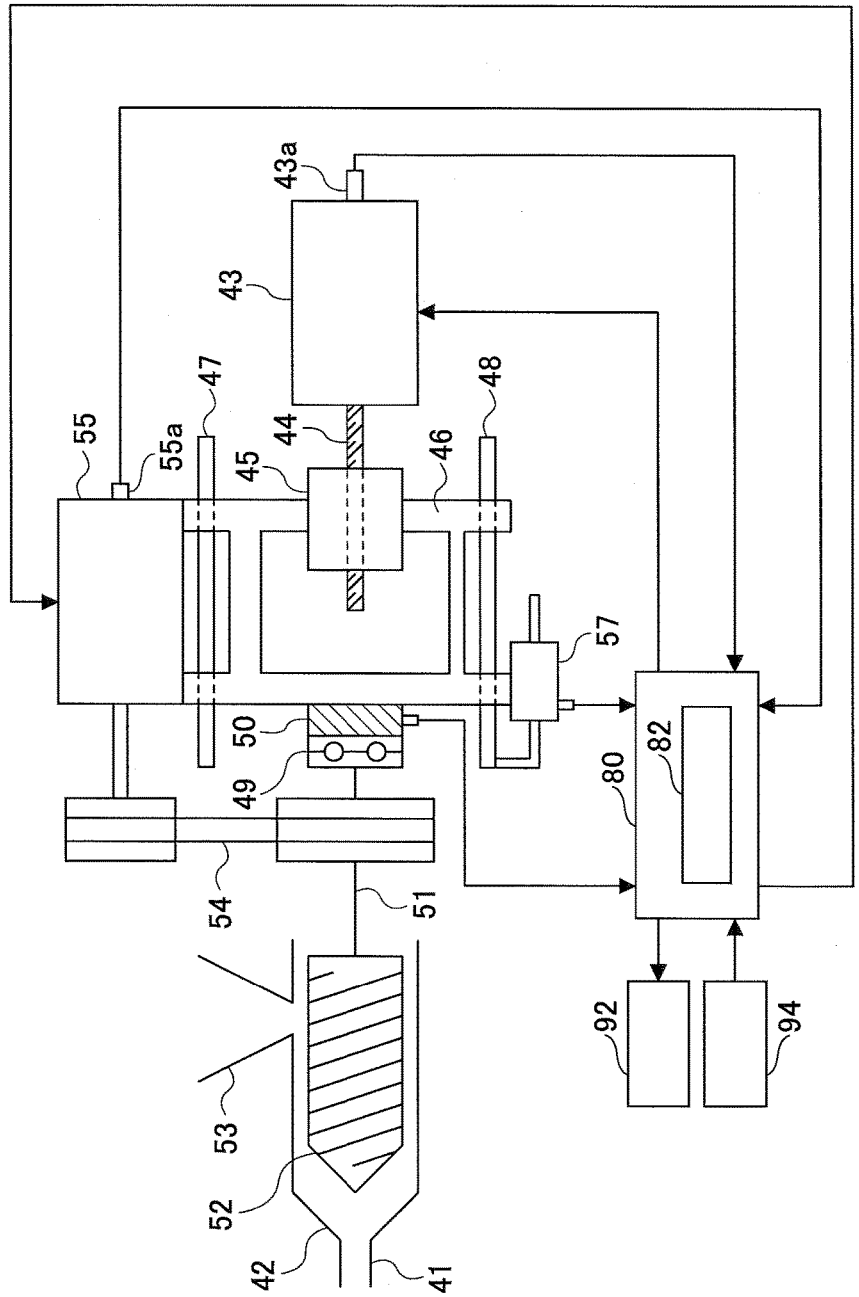
FIG. 2 is a diagram showing an injection device of the injection molding machine.

FIG. 2 is a diagram showing an injection device 40 of the injection molding machine 10 according to the present embodiment. It is noted that in the following descriptions of the injection device 40, in contrast to the above description of the mold clamping device, it is assumed that the injection direction of resin corresponds to the forward direction and the direction opposite the injection direction of resin corresponds to the backward direction.

The injection molding machine 10 includes the injection device 40 that has a heating cylinder 42 for melting resin and a nozzle 41 for injecting the molten resin into the cavity C of the mold device 30 to fill up the cavity C with the molten resin. The injection device 40 also has an injection motor 43. The rotation of the injection motor 43 is transmitted to a ball screw shaft 44. A ball screw nut 45 that moves back and forth in response to the rotation of the ball screw shaft 44 is fixed to a pressure plate 46. The pressure plate 46 is arranged to be movable along guide bars 47 and 48, which are fixed to a base frame (not shown). The back-and-forth motion of the pressure plate 46 is transmitted to a screw 52 via a bearing 49, a resin pressure detector (e.g., load cell) 50, and an injection shaft 51. The screw 52 is arranged to be rotatable within the heating cylinder 42 and movable along the direction of its rotational axis. A hopper 53 for supplying resin is arranged at the rear portion of the heating cylinder 42. The rotational motion of a metering motor 55 is transmitted to the injection shaft 51 via a linking member 54 such as a belt or a pulley. That is, the injection shaft 51 is driven and rotated by the metering motor 55 to thereby rotate the screw 52.

In a metering process, the metering motor 55 is driven to rotate the screw 52 so that resin pellets supplied to the rear end portion of the screw 52 may be transferred to the front portion of the screw 52. During this process, the resin pellets are softened and melted. The accumulation of the molten resin at the front portion of the screw 52 causes the screw 52 to move backward. In an injection process (also referred to as "filling process"), the injection motor 43 is driven to move the screw 52 forward to inject the molten resin from the nozzle 41 and push the molten resin into the cavity C. The pushing force of the screw 52 for pushing the molten resin is detected as a reaction force by the resin pressure detector 50. That is, the resin pressure (injection pressure of resin) applied to the screw 52 is detected by the resin pressure detector 50. The detected resin pressure is then input to the control unit 80. Also, because thermal contraction of resin occurs within the cavity C as a result of the cooling of the resin, a pressure holding process is performed to replenish resin to compensate for the thermal contraction of the resin. In the pressure holding process, the resin pressure (injection pressure of resin) applied to the screw 52 is maintained at a predetermined pressure.

A position detector 57 for detecting the moving distance of the screw 52 is attached to the pressure plate 46. The screw position sensor 57 inputs a detection signal indicating the detected position of the screw 52 to the control unit 80. The detection signal of the screw position sensor 57 may also be used to detect the moving speed of the screw 52.

The injection motor 43 and the metering motor 55 may be servo motors, and they each have encoders 43*a* and 55*a* attached thereto for detecting their rotational speeds. The rotational speeds detected by the encoders 43*a* and 55*a* are input to the control unit 80 as detection signals. The control unit 80 performs feedback control operations on the injection motor 43 and the metering motor 55 based on the detection signals from the encoders 43*a* and 55*a*.

The control unit 80 may comprise a microcomputer, for example, and includes various components such as a CPU, a ROM that stores programs including control programs, a readable/writable RAM that stores data including computational results, a timer, a counter, an input interface, and an output interface, for example.

(Temporal Change of Parameters Indicating the Status of the Injection Molding Machine)

Figure 3:
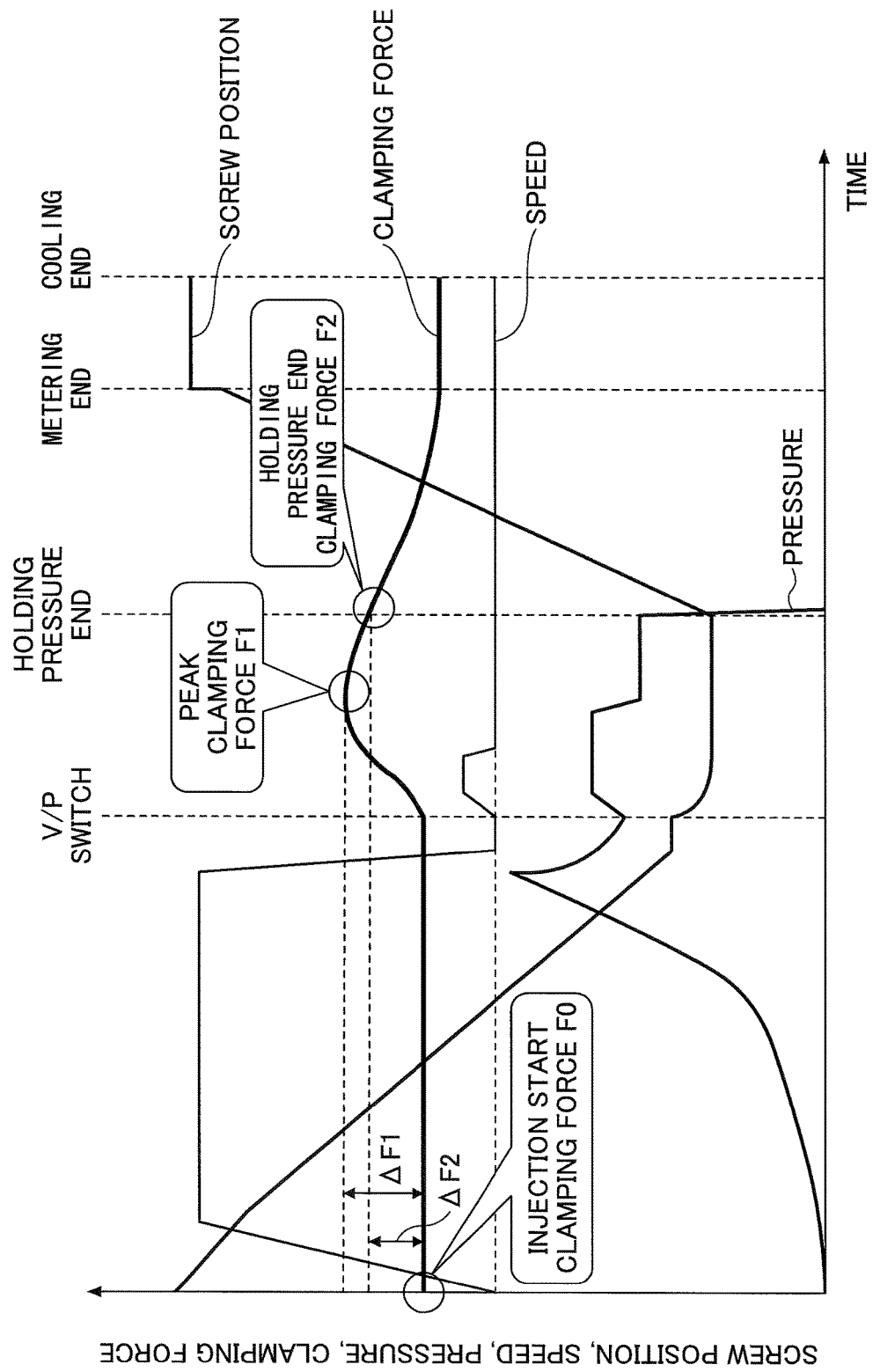
FIG. 3 is a graph showing temporal changes of various parameters indicating the status of the injection molding machine.

FIG. 3 is a graph showing temporal changes of various parameters indicating the status of the injection molding machine 10 according to the present embodiment.

In the graph of FIG. 3, the horizontal axis represents the time, and the vertical axis represents the clamping force, the screw position, the moving speed of the screw (resin injection speed), and the screw pressure (resin injection pressure).

During one cycle, the injection molding machine 10 performs a mold closing process for closing the mold device 30, a mold clamping process for clamping the mold device 30, an injection process for controlling the resin injection speed, a pressure holding process for controlling the resin injection pressure, a cooling process for solidifying the resin within the mold device 30, a metering process for metering resin to be used for manufacturing the next molding product, a mold opening process for opening the mold device 30, and an ejection process for ejecting the molding product from the opened mold device 30. By repeatedly performing the above sequence of processes, the injection molding machine 10 may successively manufacture multiple molding products. FIG. 3 shows the temporal changes of the various parameters during the injection process, the pressure holding process, the cooling process, and the metering process.

The injection process is performed after the mold clamping process. In the injection process, the injection motor 43 is driven to cause the screw 52 to move forward. As a result, the screw 52 pushes the molten resin out via the nozzle 41. The molten resin is thus injected into the cavity C via a sprue S, a runner R, and a gate G (see FIG. 1).

In the injection process, an electric current is supplied to the injection motor 43 so that the moving speed of the screw 52 may be at a preset value. The preset value for the screw speed may be gradually changed in accordance with the progression of the screw position in the forward direction. For example, the preset value for the screw speed may be changed from a first value to a second value when the detected value of the position detector 57 reaches the first value. It is noted that the preset value for the screw speed is set substantially equal to 0 (zero) before the pressure holding process is started and the screw 52 may be stopped at this point.

The switchover from the injection process to the pressure holding process is referred to as "V/P switchover." V/P switchover may be performed based on the position of the screw 52. The screw position for triggering the V/P switchover may be established by the user. Alternatively, the V/P switchover may be performed based on the time elapsed from the start of the injection process or the resin injection pressure rather than relying on the position of the screw 52.

When the resin within the cavity C is cooled, thermal contraction of the resin occurs. In order to replenish resin to compensate for the thermal contraction of resin, in the pressure holding process, the resin pressure (resin injection pressure) applied to the screw 52 is held at a predetermined pressure. In the pressure holding process, an electric current is supplied to the injection motor 43 so that the detected value of the resin pressure detector 50 may be at a preset value. The preset value for the resin injection pressure during the pressure holding process may be gradually changed in accordance with the progression of time. It is noted that since the amount of change in the screw position during the pressure holding process is relatively small, the time elapsed from the start of the V/P switchover is measured by the timer of the control unit 80 and the preset value for the resin injection pressure is preferably changed based on the measured time.

When the time elapsed from the start of the V/P switchover reaches a preset time, the preset value for the resin injection pressure is set substantially equal to 0 (zero) at which time the pressure holding process is ended. When the pressure holding process ends, the gate G corresponding to the entrance of the cavity C is sealed by the solidified resin. Such a state of the gate G is referred to as "gate seal," and in this state, the resin injection pressure cannot be transmitted to the cavity C and reverse flow of resin from the cavity C may be prevented.

After the pressure holding process, the cooling process for solidifying the resin within the cavity C is performed. In the cooling process, thermal contraction of the resin within the cavity C occurs while the supply of resin to the cavity C is blocked. It is noted that the cooling of resin occurs also during the injection process and the pressure holding process, and by the time the pressure holding process is completed, the surface of the resin is already solidified.

The metering process is performed after the pressure holding process. It is noted that the metering process may be performed during the cooling process in order to reduce the overall duration of the injection molding cycle. In the metering process, the metering motor 55 is driven to cause the screw 52 to rotate so that resin pellets supplied to the rear end portion of the screw 52 may be transferred to the front side of the screw 52. During this process, the resin pellets are softened and melted. Also, the accumulation of the resin at the front side of the screw 52 causes the screw 52 to move backward. When the screw 52 moves backward by a predetermined distance and a predetermined amount of resin is accumulated at the front side of the screw 52, the rotation of the screw 52 is stopped.

It is noted that in the injection process and the pressure holding process, the screw 52 pushes the resin towards the mold device 30 and the resulting resin pressure urges the mold device 30 to open. The force of the resin pressure urging the mold device 30 to open may vary depending on the resin injection pressure as well as the amount of resin being filled into the mold device 30, for example. When the force of the resin pressure urging the mold device 30 to open becomes greater than the clamping force, the mold device 30 may be opened.

The mold device 30 is open during the injection process and the pressure holding process, meaning the tie-bars 16 are extended longer than their extending distances at the end of the mold clamping process. The open distance of the mold device 30 is proportional to the extending distance of the tie-bars 16. Also, the extending distance of the tie-bars 16 is proportional to the increase in the detected value of the clamping force sensor 17. It is noted that the open mold distance of the mold device 30 refers to the distance of a gap formed between the parting faces of the stationary mold 32 and the movable mold 33.

The clamping force monitoring unit 82 calculates (1) a first mold open distance $\Delta X1$ that is calculated based on the difference $\Delta F1$ between the maximum value F1 of the detected value of the clamping force sensor 17 during the injection process and the pressure holding process and the detected value F0 at the start of the injection process ($\Delta F1 = F1 - F0$), and/or (2) a second mold open distance $\Delta X2$ that is calculated based on the difference $\Delta F2$ between the detected value F2 at the end of the pressure holding process and the detected value F0 at the start of the injection process ($\Delta F2 = F2 - F0$).

As described above, the mold open distance is proportional to the increase in the detected value of the clamping force sensor 17. The increase in the detected value of the clamping force sensor 17 is calculated based on the detected value F0 at the start of the injection process. At the start of the injection process, resin does not yet reach the parting surfaces of the stationary mold 32 and the movable mold 33. Thus, at this point, the resin pressure urging the mold device 30 to open is not yet generated and the mold device 30 is closed by the clamping force of the mold clamping device.

The first mold open distance $\Delta X1$ (mm) is calculated by multiplying the increase $\Delta F1$ (kN) in the detected value of the clamping force sensor 17 by a proportionality constant C (mm/kN) ($\Delta X1 = C \times \Delta F1$). Similarly, the second mold open distance $\Delta X2$ (mm) is calculated by multiplying the increase $\Delta F2$ (kN) in the detected value of the clamping force sensor 17 by the proportionality constant C (mm/kN) ($\Delta X2 = C \times \Delta F2$). The proportionality constant C may be determined based on the diameter of the tie-bars 16 in their natural states and the material of the tie-bars 16, for example. The proportionality constant C may be obtained through prior testing or based on a gauge factor determined by the material of the metal resistor used in the strain gauge (clamping force sensor 17) attached to the tie-bar 16 and may be stored in a memory of the control unit 80, for example.

The first mold open distance $\Delta X1$ represents the maximum value of the mold open distance during the injection process and the pressure holding process. It is noted that when the first mold open distance $\Delta X1$ is too large, the molten resin may overflow from the cavity C. When the overflow resin solidifies, it forms a flash around the molding product.

The second mold open distance ΔX2 represents the mold open distance at the end of the pressure holding process. When the second mold open distance ΔX2 is too large, solidified resin may come out between the parting surfaces of the stationary mold 32 and the movable mold 33 at the gate seal time to form a flash around the molding product.

As can be appreciated from above, the first mold open distance ΔX1 and the second mold open distance ΔX2 may be useful information for injection molding in that they may be indicators of the quality of the molding product. The first mold open distance ΔX1 may be particularly useful in a case where the molten resin overflows from the cavity C and forms a thin flash. In this case, since the flash formed during the injection process and the pressure holding process is relatively thin, the second mold open distance ΔX2 corresponding to the mold open distance at the gate seal time may be relatively small. On the other hand, the second mold open distance ΔX2 may be useful in a case where the molten resin is easily solidified. It is noted that a determination as to whether the first mold open distance ΔX1, the second mold open distance ΔX2, or both of the above are to be used as the indicators of the quality of the molding product may be made based on the type of resin material used, for example.

The clamping force monitoring unit 82 may evaluate the quality of the molding product based on the calculated first mold open distance ΔX1 and/or second mold open distance ΔX2.

For example, in a case where the first mold open distance ΔX1 is greater than or equal to a first reference value, the clamping force monitoring unit 82 may determine that a flash is possibly formed at the corresponding molding product and evaluate the corresponding molding product as defective. It is noted that the first reference value may be designated by the user based on past performance results, for example.

Also, in a case where the second mold open distance ΔX2 is greater than or equal to a second reference value, the clamping force monitoring unit 82 may determine that a flash is possibly formed at the corresponding molding product and evaluate the corresponding molding product as defective. It is noted that the second reference value may be designated by the user based on past performance results, for example.

Further, in a case where the first mold open distance ΔX1 is less than the first reference value and the second mold open distance ΔX2 is less than the second reference value, the clamping force monitoring unit 82 may determine that the corresponding molding product has no flash formed thereon and is therefore of good quality.

The molding product that is evaluated as defective by the clamping force monitoring unit 82 may subsequently be examined more thoroughly by an inspection machine. The molding product that is determined to be of good quality by the inspection machine or the clamping force monitoring unit 82 may be shipped. On the other hand, the molding product that has been determined to be defective by the inspection machine is not shipped and may be reused as resin material or discarded. By perfunctorily evaluating the quality of the molding product using the clamping force monitoring unit 82, the inspection load of the inspection machine may be reduced, for example.

When the defect rate of the molding product is higher than a preset value, the control unit 80 may lower the preset value for the resin injection pressure by a predetermined amount, for example. In the case where the preset value for the resin injection pressure gradually changes with the progression of time, the preset value for the resin injection pressure at the time the detected value of the clamping force sensor 17 is equal to the maximum value F1 may be lowered by a predetermined amount. In this way, the resin pressure corresponding to a force urging the mold device 30 to open may be reduced so that the formation of a flash may be prevented and the production yield of the molding product may be improved, for example.

The information obtained by the clamping force monitoring unit 82 may be recorded in a recording medium such as the memory of the control unit 80 and may be retrieved therefrom as is necessary. The information obtained by the clamping force monitoring unit 82 is recorded in the recording medium in association with ID information of the corresponding molding product. The information obtained by the clamping force monitoring unit 82 may include the first mold open distance ΔX1, the second mold open distance ΔX2, and the evaluation result of the corresponding molding product, for example.

It is noted that the injection molding machine 10 may also include a display unit 92 for displaying the information obtained by the clamping force monitoring unit 82 (see FIG. 2). The display unit 92 may be a display device such as a liquid crystal display that is controlled by the control unit 80 to display information in response to a request by a user. The request from the user may be input via an input unit 94, which may be a keyboard or a mouse, for example, that is connected to control unit 80. The display unit 92 may be configured to display the information obtained from the clamping force monitoring unit 82 in association with the ID information of the corresponding molding product.

Further, it is noted that although the present invention has been described above in connection with certain illustrative embodiments, the present invention is not limited to these embodiments, and numerous variations and modifications may be made without departing from the scope of the present invention.

For example, although the clamping force monitoring unit 82 is arranged to evaluate the quality of the molding product in the above-described embodiment, the evaluation may be made by the user as well. In another embodiment, a multi-tiered evaluation of the molding product may be performed based on the first mold open distance ΔX1 and the second mold open distance ΔX2, for example.

Also, although the injection device 40 of the above-described embodiment corresponds to a so-called in-line screw type injection device that has the screw 52 for metering and injecting resin arranged inside the heating cylinder 42, the present invention is not limited to such type of injection device. For example, in other embodiments, a plunger pre-plasticating type injection device or a screw pre-plasticating type injection device may be used.

What is claimed is:
1. An injection molding machine comprising:
a clamping force sensor that detects a clamping force of a mold; and
a clamping force monitoring unit programmed to monitor a detected value of the clamping force sensor multiple times during an injection process and multiple times during a pressure holding process to calculate
a first mold open distance based on a difference between a maximum value of the detected values obtained during the injection process and the pressure holding process, and the detected value obtained at a start of the injection process; and
a second mold open distance based on a difference between the detected value obtained at an end of the pressure holding process and the detected value obtained at the start of the injection process, wherein the mold open distance is a distance of a gap formed between a parting face of a stationary mold and a parting face of a movable mold between the start of the injection process and the end of the pressure holding process;

the injection process starts when molten resin is injected into the mold and ends when a V/P switchover is triggered, and the pressure holding process starts when the V/P switchover is completed and ends when a cooling process is initiated; and the clamping force monitoring unit is programmed to use the calculated first mold open distance and calculated second mold open distance to control a molding process to prevent the formation of flash on a molding product.

2. The injection molding machine as claimed in claim 1, wherein the clamping force monitoring unit is programmed to evaluate a quality of a molding product based on the first mold open distance and the second mold open distance.

3. The injection molding machine as claimed in claim 1, further comprising a display unit that displays information obtained by the clamping force monitoring unit.

4. An injection molding machine comprising:

a clamping force sensor that detects a clamping force of a mold; and a clamping force monitoring unit programmed to monitor a detected value of the clamping force sensor multiple times during an injection process and multiple times during a pressure holding process to calculate a mold open distance based on a difference between the detected value obtained at an end of a pressure holding process and the detected value obtained at a start of an injection process, wherein the mold open distance is a distance of a gap formed between a parting face of a stationary mold and a parting face of a movable mold between the start of the injection process and the end of the pressure holding process;

the injection process starts when molten resin is injected into the mold and ends when a V/P switchover is triggered, and the pressure holding process starts when the V/P switchover is completed and ends when a cooling process is initiated; and the clamping force monitoring unit is programmed to use the calculated mold open distance to reject a molding product as having an unacceptable amount of flash.

5. The injection molding machine as claimed in claim 4, wherein the clamping force monitoring unit is programmed to evaluate a quality of a molding product based on the mold open distance.

6. The injection molding machine as claimed in claim 1, wherein during the injection process and the pressure holding process, the mold is opened when a force of resin pressure urging the mold to open becomes greater than the clamping force.

7. The injection molding machine as claimed in claim 4, wherein during the injection process and the pressure holding process, the mold is opened when a force of resin pressure urging the mold to open becomes greater than the clamping force.

8. An injection molding machine comprising:

a clamping force sensor that detects a clamping force of a mold; and a clamping force monitoring unit programmed to monitor a detected value of the clamping force sensor multiple times during an injection process and multiple times during a pressure holding process to calculate a first mold open distance based on a difference between a maximum value of the detected values obtained during the injection process and the pressure holding process, and the detected value obtained at a start of the injection process; and a second mold open distance based on a difference between the detected value obtained at an end of the pressure holding process and the detected value obtained at the start of the injection process, wherein the mold open distance is a distance of a gap formed between a parting face of a stationary mold and a parting face of a movable mold between the start of the injection process and the end of the pressure holding process;

the injection process starts when molten resin is injected into the mold and ends when a V/P switchover is triggered, and the pressure holding process starts when the V/P switchover is completed and ends when a cooling process is initiated; and the clamping force monitoring unit is programmed to use the calculated first mold open distance and calculated second mold open distance to reject a molding product as having an unacceptable amount of flash.

\* \* \* \* \*